United States Patent [19]
Dobrica

[11] Patent Number: 5,799,047
[45] Date of Patent: Aug. 25, 1998

[54] CARRIER SYNCHRONIZATION UNIT AND SYNCHRONIZATION METHOD

[75] Inventor: Vasic Dobrica, Tokyo, Japan

[73] Assignee: NEC Corporation, Tokyo, Japan

[21] Appl. No.: 713,187

[22] Filed: Sep. 12, 1996

[30] Foreign Application Priority Data

Sep. 25, 1995 [JP] Japan ................................. 7-246196

[51] Int. Cl.$^6$ ................................................. H04B 1/10
[52] U.S. Cl. ...................... 375/350; 375/354; 364/724.17
[58] Field of Search ........................... 375/229–235,
375/261, 262, 278, 284, 285, 320, 324–326,
328–330, 340, 344, 346, 348–350, 354;
329/304, 306, 310, 349, 353; 370/491,
503; 364/724.01, 724.07, 724.17, 724.19,
724.2

[56] References Cited

U.S. PATENT DOCUMENTS

| | | | |
|---|---|---|---|
| 4,899,367 | 2/1990 | Sampei | 375/264 |
| 4,947,409 | 8/1990 | Raith et al. | 375/344 |
| 5,513,215 | 4/1996 | Marchetto et al. | 375/233 |
| 5,596,608 | 1/1997 | Sassa et al. | 375/346 |

*Primary Examiner*—Don N. Vo
*Assistant Examiner*—Amanda T. Le
*Attorney, Agent, or Firm*—Ostrolenk, Faber, Gerb & Soffen, LLP

[57] ABSTRACT

The carrier synchronization unit combines the recursive least square (RLS) type phase and amplitude estimation and the prediction in a decision-directed carrier synchronization strategy. The fading channel multiplicative distortion is estimated using an adaptive recursive least square method which minimizes a time-weighted square error. Combining prediction based on a least-square fading memory curve fit and extrapolation with RLS estimation the tracking delay effect is reduced. Resulting in an improvement of receiver performance. The proposed method minimizes the phenomenon of hang-up allowing rapid phase acquisition with high probability of success.

12 Claims, 3 Drawing Sheets

CARRIER SYNCHRONIZATION UNIT AND SYNCHRONIZATION METHOD

BACKGROUND OF THE INVENTION

The present invention relates to cellular telephone systems. More particularly, the present invention relates to a novel method of carrier synchronization in a coherent detection data communications system over frequency nonselective fading channels.

Coherent detection schemes are superior compare to differentially coherent or noncoherent schemes in terms of power efficiency. However, carrier recovery, which is necessary for coherent detection, suffers from the time variant nature of fading channels. The power efficiency provided by coherent detection in digital communication systems is only possible when the receiver is supplemented by a carrier synchronization unit. Good estimates of the complex fading distortion are essential for successful synchronization.

Rapid fading is a central problem in digital mobile communications. Due to implementation considerations and the lack of a robust phase estimation algorithm, differentially coherent detection or other noncoherent techniques have historically been used in fading channels. Significant performance improvements can be achieved if near coherent demodulation is achieved. Linear modulation schemes such as M-PSK or M-QAM which employ coherent reception potentially form highly favorable communications schemes. The power advantage of coherent detection over noncoherent detection remains or is actually enhanced when channel coding or cochannel interference are considered. When the channel is corrupted by Rayleigh fading, resulting in rapidly varying channel phase, an efficient carrier synchronization technique which derives phase from the receive signal should be used in coherent demodulation schemes.

SUMMARY OF THE INVENTION

In the present invention, a novel and improved method for carrier synchronization is proposed. The proposed method combines RLS phase and amplitude estimation and prediction in a decision-directed carrier synchronization strategy. This method can be used for carrier synchronization in an open-loop architecture by employing a free-running oscillator to mix the received signal to baseband, avoiding the performance degradation of PLL during deep fades. This method minimizes the phenomenon of hang-up allowing rapid phase acquisition with high probability of success.

The weighting factor for the RLS adaptive algorithm should be close to 1 in order to reduce the effect of noise in the multiplicative distortion estimate. The higher the weighting factor, the smaller the effect of additive noise, but the slower the rate of response to changes in multiplicative distortion. The higher the weighting factor the less rapid the convergence of the RLS estimator, which effectively introduce tracking delay in estimation. This tracking delay is destructive in a decision-directed synchronization strategy and leads to burst errors.

When both components of complex-valued multiplicative distortion due to fading become small at the same time, they cause an amplitude deep and a large phase change. Such rapid phase variations cause difficulties for phase tracking systems such as a decision-directed synchronization system. Tracking delay in this case causes symbol decision errors and using these erroneous symbols for estimation further degrades estimation, which leads to phase errors and hang-up of the synchronization unit.

In the present invention, a novel and improved method to reduce the RLS estimation tracking delay effect is proposed.

The reduction in tracking delay results in an improvement in receiver performance.

Combining prediction, which is based on a least-squares fading memory curve fit and extrapolation, with RLS estimation, the tracking delay effect can be reduced, which results in an improvement of BER receiver performance. The predictor uses the current and past multiplicative distortion estimates to predict multiplicative distortion n symbols in the future. Using a high weighting factor in the RLS adaptive algorithm, the effect of noise in multiplicative distortion estimates can be greatly reduced. These noiseless estimates are used for prediction, so the noise enhancement in the prediction process isn't so high and can be neglected.

The tracking delay problem has been overcame by incorporating a fading-memory prediction scheme, which results in an improvement of carrier tracking capability and overall receiver performance.

Coherent detection in frequency-flat fading channels has advantages over noncoherent detection when the issue of power efficiency is considered.

However, carrier recovery, which is necessary for coherent detection, suffers from the time-variant nature of fading channels.

In the present invention a novel and improved method for carrier synchronization is proposed. The proposed method combines RLS phase and amplitude estimation with prediction in a decision-directed carrier synchronization architecture. Combining RLS phase and amplitude estimation with prediction, the tracking delay problem has been overcome, resulting in an improvement in carrier tracking capability and overall BER receiver performance.

BRIEF DESCRIPTION OF THE DRAWINGS

The feature and advantages of the present invention will become more apparent from the detailed description set forth below. Here is the brief description of the drawings.

DESCRIPTION OF THE PREFERRED EMBODIMENTS

Figure 1:
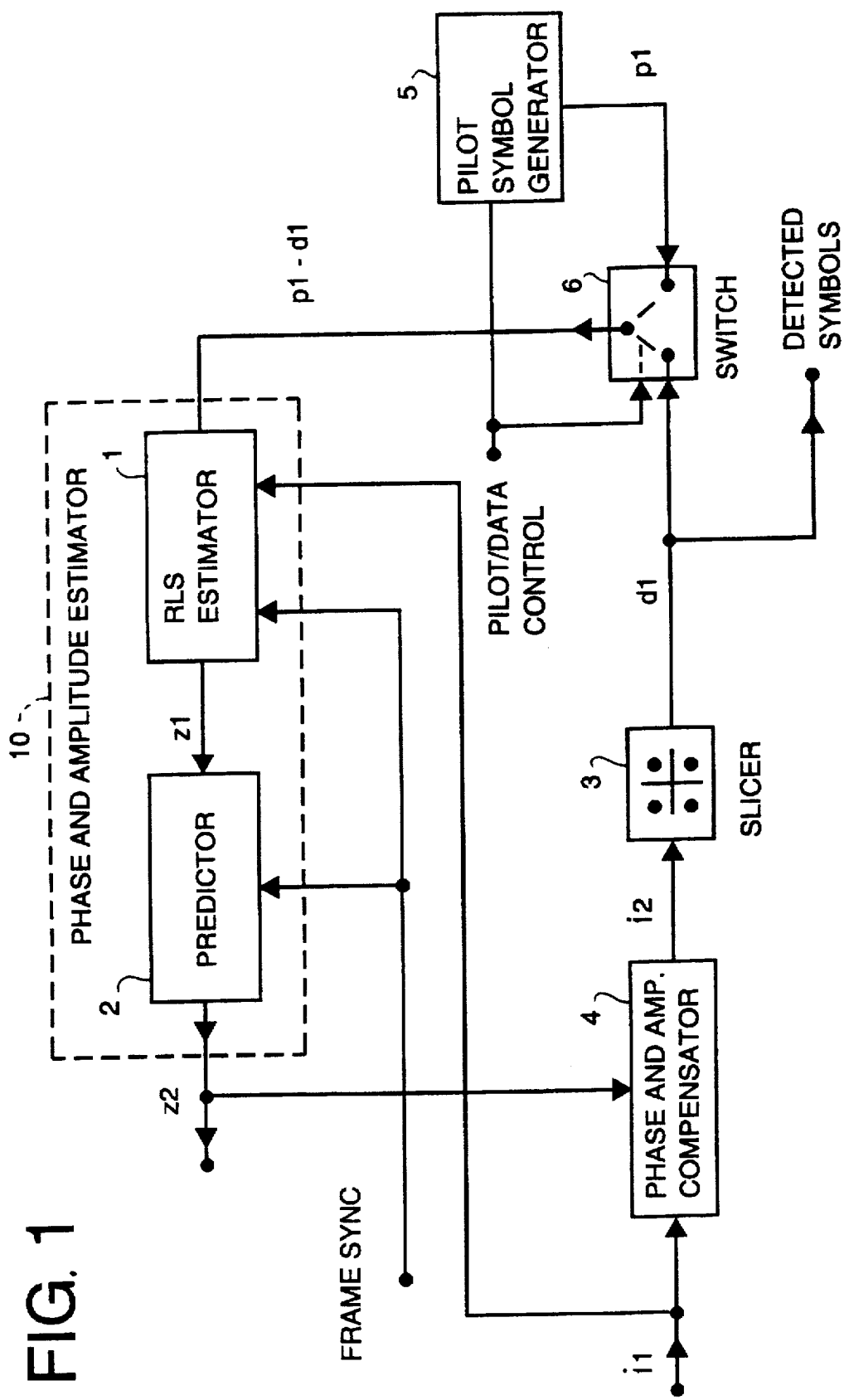
FIG. 1 is an exemplary block diagram of the carrier synchronization unit which combines RLS phase and amplitude estimation with prediction in a decision-directed carrier synchronization architecture.

FIG. 1 illustrates an exemplary block diagram of the decision-directed carrier synchronization unit, which combines RLS phase and amplitude estimation and prediction for carrier recovery. The complex-valued baseband linearly modulated received signal, i1, is used to estimate multiplicative distortion due to fading. The in-phase and quadrature (referred to as I/Q, hereinafter) components of the fading multiplicative distortion are lowpass processes and well suited for multiplicative distortion I/Q estimation. The lowpass property of the I/Q components of multiplicative distortion due to fading has been verified in many physical measurements for land-mobile communications and for aeronautical satellite communications. In the proposed method, phase and amplitude estimation is performed by estimating the I/Q components of multiplicative distortion. The amplitude information, the magnitude of the complex multiplicative distortion, delivered by such a scheme could be used in fine automatic gain control (referred to as AGC, hereinafter) at no cost. Diversity reception and maximal ratio combining can be easily implemented using this carrier synchronization unit, since this unit delivers the optimal estimates of channel gain.

Figure 2:
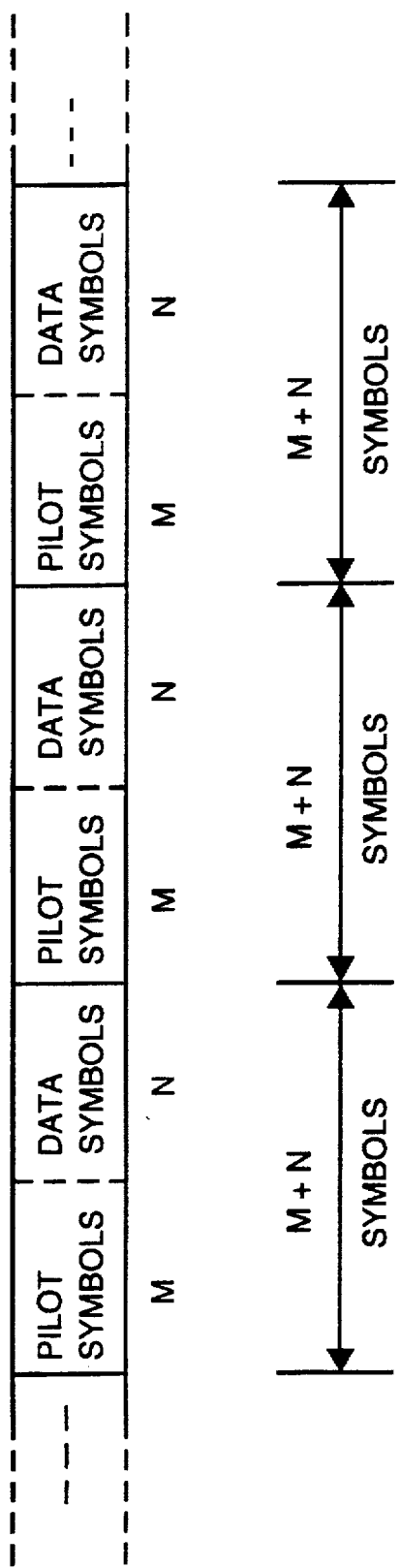
FIG. 2 illustrates the frame structure of the transmission scheme. The transmitter periodically inserts known symbols, pilot symbols, which the carrier synchronization unit uses for training in a phase and amplitude estimation process.

The transmitter periodically inserts known symbols, pilot symbols, which the receiver uses for training the phase and amplitude estimator 10. This frame structured transmission is illustrated in FIG. 2. The transmitter sends M pilot symbols, then N data symbols, then M new pilot symbols and so on. N/M ratios higher than 15 can be used, so the loss due to known symbol insertion can be neglected. These pilot symbols assist in recovery after the occurrence of phase errors by correcting phase and amplitude estimates during periods of training. Due to deep fades, or due to additive noise, phase reference jumps can occur, which can be corrected by using pilot symbol assistance. Correction leads to suppression of the error floor and enables multilevel modulation. However, no changes to the transmitted pulse shape or peak to average power ratio, so there is no increase in the complexity of the transmitter or receiver.

Refer FIG. 1. The phase and amplitude estimator 10 derives phase and amplitude estimates from receive signal, i1, using detected symbols, d1, or known pilot symbols, p1. Switch 6 selects detected symbols, d1, or known pilot symbols, p1, where frame synchronization is assumed, so the local pilot symbol generator 5 and control of the switch 6 are both synchronized with frame structured transmission. The phase and amplitude estimator 10 is the combination of a RLS phase and amplitude estimator 1 and predictor 2. The RLS phase and amplitude estimator 1 estimates multiplicative distortion, z1, by using an RLS adaptive algorithm.

Figure 3:
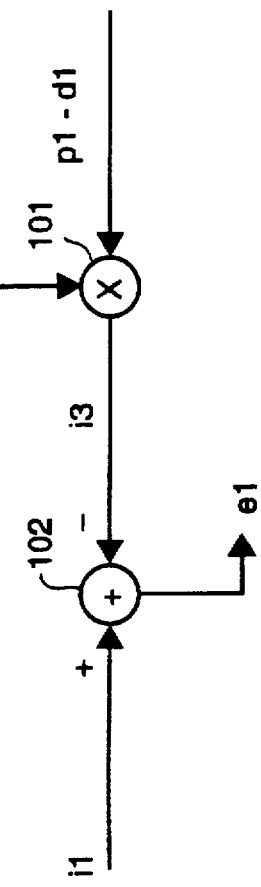
FIG. 3 is a detailed illustration of the phase & amplitude estimation process. The multiplicative distortion is calculated by using an RLS adaptive algorithm minimizing weighting square error between the receive signal and it's estimate. The estimate of the receive signal is formed by multiplying detected symbols and pilot symbols with multiplicative distortion estimates. Intersymbol interference free reception is assumed.

FIG. 3 is a more detailed illustration of the RLS phase and amplitude estimation process. Symbol sequence p1_d1 is formed by time multiplexing detected symbols, d1, and pilot symbols, p1. Symbol sequence p1_d1 and receive signal i1, are used as inputs for multiplicative distortion estimation z1. Multiplying symbols p1_d1 with the multiplicative distortion estimation z1, the estimation of receive signal, i3, is generated. The error signal e1 is calculated by subtracting receive signal estimate, i3, from receive signal, i1, as illustrated in FIG. 3. The RLS adaptive algorithm minimizes the time-average weighted squared error e1. The weight attached to any error e1 is reduced exponentially with the age of the error, so the algorithm minimizes:

$$\sum_{i=0}^{T} |e1(i)|^2 w^{T-i} \quad 0 < w < 1$$

where W is the weighting factor for the RLS adaptive algorithm.

The higher the weighting factor W, the smaller the effect of additive noise on estimate z1, but the slower the rate of response of z1 to changes in multiplicative distortion. Using a higher weighting factor W for RLS estimation effectively introduces tracking delay in estimation z1. Correct symbol rate sampling timing and intersymbol-interference-free reception are assumed. The baseband receive signal, i1, is sampled once per symbol interval, at time instants $\{iT\}$, to give the samples $\{r1_i\}$ which are used by the RLS estimator 1 for multiplicative distortion estimation. The RLS estimator 1 outputs a sequence of complex valued estimates $z1_i$, at time $t=iT$, where T is the symbol interval.

The predictor 2 in FIG. 1 uses current and past multiplicative distortion estimates, z1, to predict the multiplicative distortion, z2, n symbols in the future. The prediction is based on Morrision's least-square fading memory prediction algorithm.

Using a sequence of estimates $z1_i$, the predictor 2 forms an n-step prediction $z2_{i+n,i}$ of multiplicative distortion. To form n-step prediction $z2_{i+n,i}$ the predictor 2 must first determine the one-step prediction $z2_{i+1,i}$, by applying Morrision's degree-1 least-squares fading-memory prediction algorithm to estimates $z1_i$, $z1_{i-1}$, $z1_{i-2}$. . . The predictor 2 evaluates the following complex-values:

$$d_i = z1_i - z2_{i,i-1} \quad (1)$$

$$z2'_{i+1,i} = z2'_{i,i-1} + (1-Q)^2 d_i \quad (2)$$

$$z2_{i+1,i} = z2_{i,i-1} + z2'_{i+1,i} + (1-Q^2) d_i \quad (3)$$

$$z2_{i+n,i} = z2_{i+1,i} + (n-1)z2'_{i+1,i} \quad (4)$$

The $z2'_{i+1,i}$ is an estimate of the difference between $Z1_{i+1}$ and $z1_i$ and hence of the rate of change of $z1_i$ with i. The algorithm assumes that $z1_i-z1_{i-1}$ is effectively invariant with i, over several adjacent values of i. Q is the prediction algorithm memory coefficient, a real-valued constant in the range 0 to 1 and usually close to 1.

Figure 4:
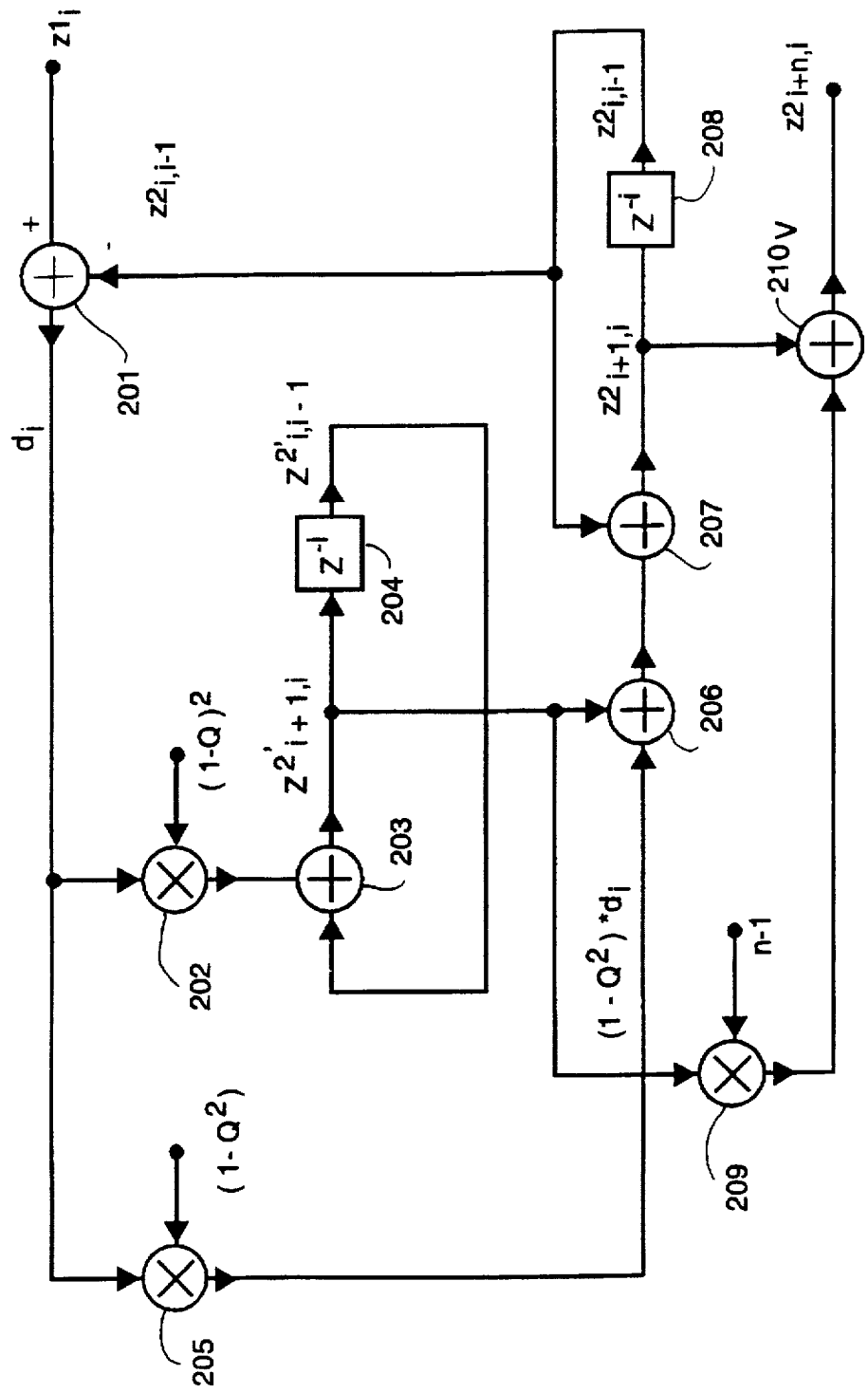
FIG. 4 illustrates the calculation method for the prediction process. The prediction is based on Morrison's least-square fading-memory prediction algorithm, and the predictor uses current and past multiplicative distortion estimates to predict the multiplicative distortion in the future.

FIG. 4 illustrates the calculation using equation 1,2,3 and 4. This figure is a detailed the processing of predictor 2 in FIG. 1. The calculation for equation 1 is illustrated by subtractor 201. Blocks 202, 203 and 204 are used for the calculation of equation 2. Equation 3 is showed by blocks 205, 206, 207 and 208. Finally, the calculation for equation 4 is showed by blocks 209 and 210. To start the process of prediction at the first received sample $z1_1$, the predictor sets:

$$z2_{1,0} = z1_0, \quad z2'_{1,0} = 0 \quad (5)$$

To restart the process of prediction at the time kT the predictor sets:

$$z2_{k,k-1} = z1_{k-1}, \quad z2'_{k,k-1} = 0 \quad (6)$$

To restart the process of RLS estimation, the RLS estimator 1 in FIG. 1 sets internal memory values to zero, canceling in that way the impact of previous received samples on further estimates.

Deep fades and noise cause differences between real multiplicative distortion and it's estimate which introduce the decision errors. These errors in a decision-directed carrier synchronization strategy affect the estimation which could lead to hang-up of the synchronization unit. To overcome these shortcomings the known pilot symbols are used for training the phase and amplitude estimator as illustrated in FIG. 2. During the training intervals the synchronization unit recovers from hang-up and starts correct estimation. In order to minimize the loss due to inserted pilot symbols only several pilot symbols are used per training interval. When a high RLS weighting factor is used in order to suppress the noise in estimates, the recovery from hang-up and estimation correction can not be done during training intervals, due to the high impact of previous samples to the RLS estimation. To speed-up the process of estimation during training intervals, restart of the RLS estimator process is done by internal memory reset at the beginning of each training interval. At the end of the training interval the restart of the prediction process should be done using the updated estimate for the preset, as specified by equations 5 and 6.

The compensator 4 in FIG. 1 uses the estimated and predicted multiplicative distortion value, z2, for phase and amplitude compensation of the receive signal, i1. The compensator 4 multiplies receive signal, i1, by the complex value 1/z2. Using compensated signal, i2, slicer 3 makes a decision and outputs detected symbols, d1. Coherently detected symbols, d1, in a decision-directed synchronization strategy are used for phase and amplitude estimation of multiplicative distortion in the frequency nonselective fading channels. Assuming that the receiver is operating under reasonably low error rate conditions, detected symbols, d1, can be satisfactorily used for the process of multiplicative distortion estimation. This symbol detection is needed here for the sake of multiplicative distortion estimation and does not necessarily to coincide with the actual detection process at the receiver. Signals i1, i2, d1, p1, p1_d1, z1 and z2 are complex-valued signals with I/Q quadrature components. All processing is at the symbol rate. The sample of each signal in time instant iT, is noted by index i, where T is the symbol interval. All processing is at the symbol rate.

Combining prediction, which is based on a least-squares fading memory curve fit and extrapolation, with RLS estimation, the tracking delay effect can be reduced, which results in an improvement in BER performance. The proposed carrier recovery method minimizes the phenomenon of hang-up, with the possibility to extract channel quality information for the decoder. It is well suited for digital implementation, which meets the all digital realization requirements of a receiver in modern communication systems.

What is claimed is:

1. The carrier synchronization unit comprising:
   RLS phase and amplitude estimation means for estimating phase and amplitude of distortion due to fading based on RLS algorithm;
   prediction means for predicting distortion n symbols (n is an integer) in the future, that is operatively cohering to said RLS phase and amplitude estimation means;
   compensation means for compensating distortion of a received signal based on said estimated phase and amplitude of distortion;
   detection means for coherently detecting data symbols based on compensated signal in said compensation means; and
   means for periodically training said distortion estimation means.

2. The carrier synchronization unit of claim 1, wherein said RLS phase and amplitude estimation means comprises means for deriving phase and amplitude from said received signal in a decision-directed configuration by using an RLS adaptive algorithm that minimizes a time-average weighted squared error.

3. The carrier synchronization unit of claim 2, further comprising means for avoiding hang-up state in decision-directed process using pilot symbols for training indicated by known symbols periodically inserted.

4. The carrier synchronization unit of claim 2, wherein said RLS phase and amplitude estimation means comprises means for accelerating estimation process during said training intervals by setting internal memory of said RLS estimation means to zero canceling the effect of previous received samples on further estimation.

5. The carrier synchronization unit of claim 4 comprising:
   means for generating pilot symbols during training intervals; and
   multiplexing means for structuring frame multiplexing said pilot symbols and said detected symbols.

6. The carrier synchronization unit of claim 1, wherein said prediction means comprises means for predicting distortion n symbols (n is an integer) in the future using said current and past distortion values that is estimated by said phase and amplitude estimation means based on RLS algorithm wherein the prediction is based on Morrison's least-square fading-memory prediction algorithm.

7. The carrier synchronization unit of claim 5, wherein said prediction means comprises predicting distortion n steps in the future and compensating a tracking delay that is introduced by said RLS phase and amplitude estimation means.

8. The carrier synchronization unit of claim 5, further comprising means for restarting prediction process using updated estimation value during said training intervals.

9. The carrier synchronization unit of claim 2, wherein said compensation means comprises means for cohering to said RLS phase and amplitude estimation means and responsive for phase and amplitude compensation of received signal.

10. The carrier synchronization unit of claim 2, wherein said detection means for detecting symbols based on received signal that is phase and amplitude compensated, using phase and amplitude estimation of distortion in a decision-directed carrier synchronization.

11. A carrier synchronization method comprising the steps of:
   estimating phase and amplitude distortion due to fading based on RLS algorithm;
   predicting distortion n symbols (n is an integer) operatively cohering to the RLS estimated phase and amplitude distortion;
   compensating distortion in a received signal due to fading based on the RLS estimated phase and amplitude distortion;
   coherently detecting symbols in the compensated received signal.

12. The carrier synchronization method of claim 11, comprising ratios higher than fifteen for detected symbols and pilot symbols.

* * * * *